United States Patent
Oshima et al.

(10) Patent No.: US 9,678,325 B2
(45) Date of Patent: Jun. 13, 2017

(54) ANALYSIS APPARATUS, ANALYSIS PROGRAM, AND ANALYSIS SYSTEM

(71) Applicant: Sony Corporation, Tokyo (JP)

(72) Inventors: Shiori Oshima, Kanagawa (JP); Suguru Dowaki, Kanagawa (JP); Eriko Matsui, Tokyo (JP)

(73) Assignee: Sony Corporation, Tokyo (JP)

( * ) Notice: Subject to any disclaimer, the term of this patent is extended or adjusted under 35 U.S.C. 154(b) by 357 days.

(21) Appl. No.: 14/226,429

(22) Filed: Mar. 26, 2014

(65) Prior Publication Data

US 2014/0300723 A1   Oct. 9, 2014

(30) Foreign Application Priority Data

Apr. 9, 2013  (JP) .................................. 2013-081475

(51) Int. Cl.

| | |
|---|---|
| *G06T 7/571* | (2017.01) |
| *G02B 21/36* | (2006.01) |
| *G06K 9/00* | (2006.01) |
| *G06T 7/73* | (2017.01) |

(52) U.S. Cl.
CPC ......... *G02B 21/365* (2013.01); *G02B 21/367* (2013.01); *G06K 9/00134* (2013.01); *G06T 7/571* (2017.01); *G06T 7/74* (2017.01); *G06T 2207/10056* (2013.01); *G06T 2207/30024* (2013.01)

(58) Field of Classification Search
CPC ............... G02B 21/365; G02B 21/367; G06K 9/00134; G06T 7/0044; G06T 7/0069; G06T 2207/10056; G06T 2207/30024

USPC .......................................................... 348/79
See application file for complete search history.

(56) References Cited

U.S. PATENT DOCUMENTS

| | | | | |
|---|---|---|---|---|
| 2004/0026619 A1* | 2/2004 | Oh | ...................... | G01N 23/2251 250/307 |
| 2004/0246479 A1* | 12/2004 | Cartlidge | ........... | G01N 21/6458 356/335 |
| 2005/0031183 A1* | 2/2005 | Wrigglesworth | ......... | G06T 7/20 382/133 |
| 2009/0310833 A1* | 12/2009 | Ascenzi | ............... | G06K 9/0014 382/128 |

FOREIGN PATENT DOCUMENTS

JP     2010-169823     8/2010

* cited by examiner

*Primary Examiner* — William C Vaughn, Jr.
*Assistant Examiner* — Jae N Noh
(74) *Attorney, Agent, or Firm* — K&L Gates LLP

(57) ABSTRACT

An analysis apparatus includes a two-dimensional coordinate detecting unit and a three-dimensional coordinate determining unit. The two-dimensional coordinate detecting unit is configured to detect, with respect to a captured image group obtained by capturing an analysis specimen including an analysis target object at a plurality of focal depths, a two-dimensional coordinate candidate being a candidate of a plane coordinate of the analysis target object in each captured image. The three-dimensional coordinate determining unit is configured to determine, based on a position relationship of the plane coordinate candidates between the captured images, a three-dimensional coordinate candidate being a candidate of a three-dimensional coordinate of the analysis target object.

11 Claims, 12 Drawing Sheets

| Evaluation function rank | Well 1 | 2 | 3 | 4 | 5 | 6 |
|---|---|---|---|---|---|---|
| First | | | | | | |
| Second | | | | | | |
| Third | | | | | | |
| Fourth | | | | | | |
| Fifth | | | | | | |

FIG.16

ANALYSIS APPARATUS, ANALYSIS PROGRAM, AND ANALYSIS SYSTEM

CROSS REFERENCES TO RELATED APPLICATIONS

The present application claims priority to Japanese Priority Patent Application JP 2013-081475 filed in the Japan Patent Office on Apr. 9, 2013, the entire content of which is hereby incorporated by reference.

BACKGROUND

The present disclosure relates to an analysis apparatus, an analysis program, and an analysis system, by which an analysis target object included in an analysis specimen is detected from an image obtained by capturing the analysis specimen.

When observing an analysis target object such as a cell with a microscope, for example, if the cell is floating in culture, an observer needs to search for it. However, a field of view is small at a high magnification of the microscope, and hence the observer needs to search for the analysis target object while largely moving a field-of-view range. Meanwhile, if the size of the analysis target object is small at a low magnification of the microscope and the analysis target object is lost in air bubbles and the like, and hence the search needs high personal costs.

For example, even if time-lapse imaging in which the analysis target object is imaged over time is performed, there is a low possibility that the analysis target object remains at the same position during capturing images. Therefore, the observer needs to search for the analysis target object every time when an image is captured. In addition, there is a fear that the analysis target object searched out by the observer is different from the previously imaged object.

In view of the above-mentioned problems, techniques of automatically searching for an analysis target object have been developed. For example, Japanese Patent Application Laid-open No. 2010-169823 (hereinafter, referred to as Patent Document 1) describes a technique of predicting a motion of a previously found cell or the like by a motion prediction model and utilizing it in cell tracking.

SUMMARY

However, the technique described in Patent Document 1 is a technique applied to the previously found cell or the like and not a technique of exhaustively searching for a cell having a size of a few micrometers in the entire field of view of a cell culture vessel or the like. The observer needs to search for an original position of a cell or the like.

In the above-mentioned circumstances, it is desirable to provide an analysis apparatus, an analysis program, and an analysis system, by which a position of an analysis target object can be automatically determined.

According to an embodiment of the present disclosure, there is provided an analysis apparatus including a two-dimensional coordinate detecting unit and a three-dimensional coordinate determining unit.

The two-dimensional coordinate detecting unit is configured to detect, with respect to a captured image group obtained by capturing an analysis specimen including an analysis target object at a plurality of focal depths, a two-dimensional coordinate candidate being a candidate of a plane coordinate of the analysis target object in each captured image.

The three-dimensional coordinate determining unit is configured to determine, based on a position relationship of the plane coordinate candidates between the captured images, a three-dimensional coordinate candidate being a candidate of a three-dimensional coordinate of the analysis target object.

With this configuration, the analysis apparatus is capable of determining the three-dimensional coordinate candidate of the analysis target object included in the analysis specimen by performing image processing on the captured image group. Thus, a user does not need to search for the analysis target object while moving a field of view of a microscope optical system, and hence the personal costs can be reduced.

The analysis apparatus may further include an evaluation unit configured to evaluate similarity between an object image located at the three-dimensional coordinate candidate and an analysis target object image by an evaluation function.

With this configuration, the analysis apparatus is capable of presenting the similarity between the object image located at the determined three-dimensional coordinate candidate and the analysis target object image to the user. The user can know the three-dimensional coordinate candidate having a high possibility of being the analysis target object.

The three-dimensional coordinate determining unit may be configured to determine the three-dimensional coordinate candidate based on a continuous number of the two-dimensional coordinate candidate in a focal depth direction.

With this configuration, the three-dimensional coordinate determining unit is capable of determining one having the continuous number within the predetermined range as the three-dimensional coordinate candidate of the analysis target object, and excluding those having the continuous number out of the predetermined range from the three-dimensional coordinate candidate of the analysis target object. Thus, the three-dimensional coordinate determining unit is capable of determining a three-dimensional coordinate of the analysis target object depending on the size of the object image in the focal depth direction.

The two-dimensional coordinate detecting unit may be configured to detect the two-dimensional coordinate candidate by comparing a feature amount of the captured image with a template indicating a feature amount of the analysis target object.

With this configuration, the two-dimensional coordinate detecting unit is capable of judging that the analysis target object image is present in an area of an image of a captured image having highest similarity to the feature amount of the template, and detecting a coordinate of the template at this time as the two-dimensional coordinate candidate.

The two-dimensional coordinate detecting unit may be configured to extract a first feature amount from the captured image, detect a preliminary two-dimensional coordinate candidate based on the first feature amount, set a comparison range around the preliminary two-dimensional coordinate candidate, extract a second feature amount from the captured image included in the comparison range, and compare the second feature amount with the template, to thereby detect the two-dimensional coordinate candidate.

With this configuration, the two-dimensional coordinate detecting unit is capable of performing a comparison with the template in the comparison range set around the preliminary two-dimensional coordinate candidate detected using the first feature amount, and detecting the two-dimensional coordinate candidate. Thus, it is sufficient that the two-dimensional coordinate detecting unit performs a comparison with the template not in the entire captured image but only in the comparison range, and hence the two-dimensional coordinate detecting unit is capable of performing a comparison at high speed.

The first feature amount may be a luminance difference between pixels of a first number of pixels, and the second feature amount may be a luminance difference between pixels of a second number of pixels larger than the first number of pixels.

With this configuration, the two-dimensional coordinate detecting unit extracts, from the entire captured image, the luminance difference between pixels of a small number of pixels (first number of pixels) as the first feature amount, and hence the two-dimensional coordinate detecting unit is capable of performing an extraction at high speed. On the other hand, the two-dimensional coordinate detecting unit extracts the luminance difference between the pixels of a large number of pixels (second number of pixels) from the captured image included in the comparison range as the second feature amount, and hence the two-dimensional coordinate detecting unit is capable of extracting the second feature amount at high accuracy. When the number of pixels from which the luminance difference is extracted is large, it takes much time to extract the luminance difference. However, it is sufficient that the two-dimensional coordinate detecting unit extracts the second feature amount only from the comparison range. Thus, the two-dimensional coordinate detecting unit is capable of detect the two-dimensional coordinate candidates at high speed and high accuracy by using both two feature amounts of the first feature amount and the second feature amount.

The analysis apparatus may further include an evaluation unit configured to evaluate similarity between an object image located at the three-dimensional coordinate candidate and an analysis target object image by using an evaluation function using a difference between the second feature amount of the captured image included in the comparison range and a feature amount of the template when the second feature amount most closely matches the template.

With this configuration, the evaluation unit is capable of presenting the similarity between the object image located at the determined three-dimensional coordinate candidates and the analysis target object image to the user. The user can know the three-dimensional coordinate candidate having a high possibility of being the analysis target object. The evaluation unit is capable of carrying out an evaluation of the similarity at high speed and high accuracy by using the difference between the second feature amount of the previously extracted captured image and the feature amount of the template for the evaluation function.

The two-dimensional coordinate detecting unit may be configured to calculate a luminance difference between a center portion and a peripheral portion of the captured image included in the comparison range when the second feature amount most closely matches the template and to verify the two-dimensional coordinate candidate by using the luminance difference.

With this configuration, the two-dimensional coordinate detecting unit is capable of excluding those not satisfying the condition of the luminance of the analysis target object image from the object image located at the detected two-dimensional coordinate candidate.

The evaluation unit may be configured to evaluate, by an evaluation function using the luminance difference in addition to the difference between the second feature amount and the template, the similarity between the object image located at the three-dimensional coordinate candidate and the analysis target object image.

With this configuration, the evaluation unit is capable of carrying out an evaluation of the similarity by using the evaluation function using the luminance difference used in the detection of the two-dimensional coordinate candidate in addition to the difference of the feature amount described above.

According to another embodiment of the present disclosure, there is provided an analysis program that causes an information processing apparatus to function as a two-dimensional coordinate detecting unit and a three-dimensional coordinate determining unit.

The two-dimensional coordinate detecting unit is configured to detect, with respect to a captured image group obtained by capturing an analysis specimen including an analysis target object at a plurality of focal depths, a two-dimensional coordinate candidate being a candidate of a plane coordinate of the analysis target object in each captured image.

The three-dimensional coordinate determining unit is configured to determine, based on a position relationship of the plane coordinate candidates between the captured images, a three-dimensional coordinate candidate being a candidate of a three-dimensional coordinate of the analysis target object.

According to still another embodiment of the present disclosure, there is provided an analysis system including a microscope imaging apparatus, an analysis apparatus, and a control apparatus.

The analysis apparatus includes a two-dimensional coordinate detecting unit configured to detect, with respect to a captured image group obtained by the microscope imaging apparatus capturing an analysis specimen including an analysis target object at a plurality of focal depths, a two-dimensional coordinate candidate being a candidate of a plane coordinate of the analysis target object in each captured image, and a three-dimensional coordinate determining unit configured to determine, based on a position relationship of the plane coordinate candidates between the captured images, a three-dimensional coordinate candidate being a candidate of a three-dimensional coordinate of the analysis target object.

The control apparatus is configured to control the microscope imaging apparatus by using the three-dimensional coordinate candidate.

As described above, according to the embodiments of the present disclosure, it is possible to provide an analysis apparatus, an analysis program, and an analysis system, by which a position of an analysis target object can be automatically determined.

These and other objects, features and advantages of the present disclosure will become more apparent in light of the following detailed description of best mode embodiments thereof, as illustrated in the accompanying drawings.

Additional features and advantages are described herein, and will be apparent from the following Detailed Description and the figures.

BRIEF DESCRIPTION OF THE FIGURES

FIG. 16 shows a comparison result according to the example of the present disclosure.

DETAILED DESCRIPTION

Hereinafter, an analysis system according to an embodiment of the present disclosure will be described.

[Configuration of Analysis System]

Figure 1:
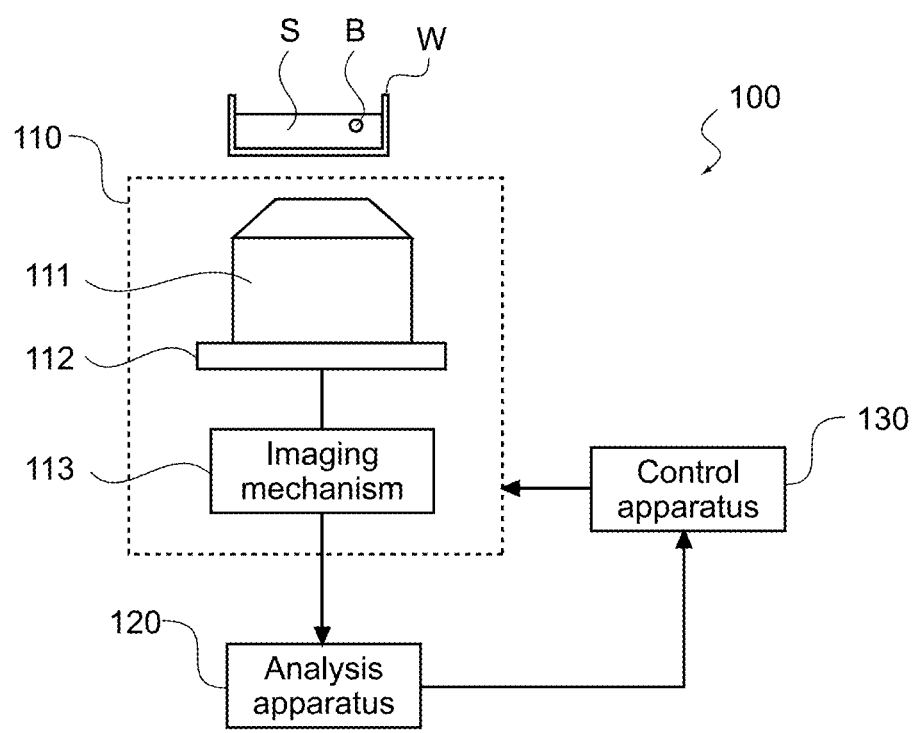
FIG. 1 is a schematic diagram showing a configuration of an analysis system according to an embodiment of the present disclosure.

FIG. 1 is a schematic diagram showing a configuration of an analysis system 100 according to this embodiment. As shown in the figure, the analysis system 100 includes a microscope imaging apparatus 110, an analysis apparatus 120, and a control apparatus 130. Further, FIG. 1 shows an analysis specimen S contained in a well W. The analysis specimen S includes an analysis target object B. The analysis target object B is, for example, a floating cell. The analysis specimen S is, for example, a cell culture solution.

The microscope imaging apparatus 110 includes a microscope optical system 111, an XYZ stage 112, and an imaging mechanism 113. The microscope optical system 111 includes various lenses such as an objective lens and a focusing mechanism. A microscope enlarged image of the analysis specimen S is generated. The XYZ stage 112 is configured to be capable of moving the microscope optical system 111 in each of an X-direction, a Y-direction, and a Z-direction. Note that the Z-direction is a focal depth direction of the microscope optical system 111, and the X-direction and the y-direction are both orthogonal to the Z-direction and orthogonal to each other. The imaging mechanism 113 includes an imaging element such as a CCD (Charge Coupled Device) and a CMOS (Complementary Metal Oxide Semiconductor). The imaging mechanism 113 captures the microscope enlarged image of the analysis specimen S generated by the microscope optical system 111 and supplies the microscope enlarged image to the analysis apparatus 120.

Figure 2:
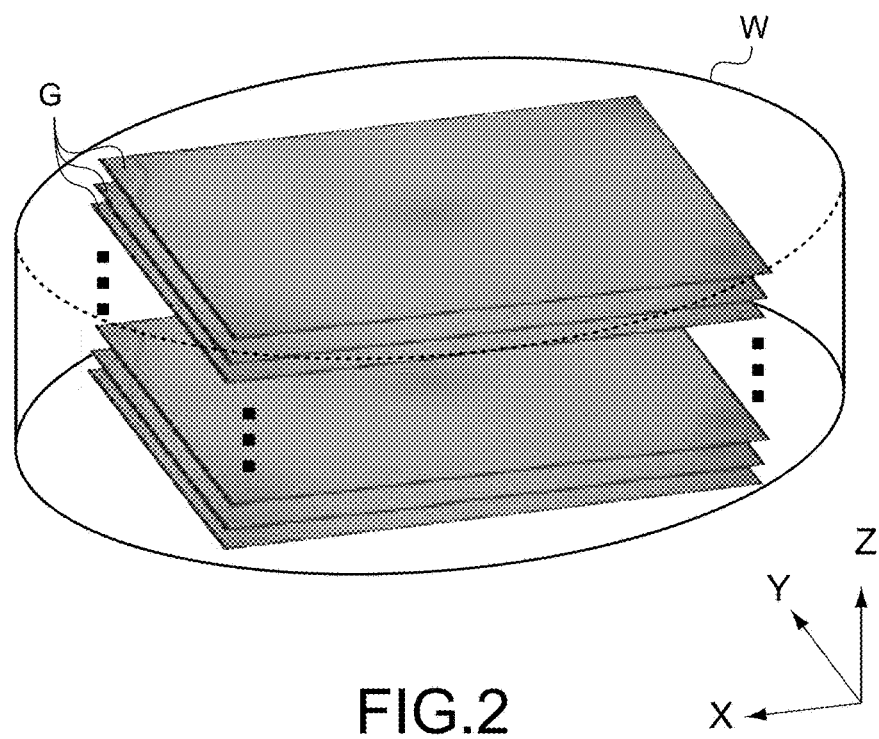
FIG. 2 is a schematic diagram showing a captured image group captured by a microscope imaging apparatus of the analysis system.

The microscope imaging apparatus 110 images the analysis specimen S at a plurality of focal depths and generates a captured image group including a plurality of captured images G. FIG. 2 is an example of the captured image group. While moving the focal depth in the Z-direction by the focusing mechanism, the microscope imaging apparatus 110 may cause the imaging mechanism 113 to image the analysis specimen S in the well W at a plurality of focal depths (Z-Stack imaging) and generate the captured image group (Z-Stack images). Further, the microscope imaging apparatus 110 may cause the imaging mechanism 113 to image the analysis specimen S at a plurality of focal depths while moving the microscope optical system 111 in the Z-direction by the XYZ stage 112.

The configuration of the microscope imaging apparatus 110 is not limited to the configuration shown here and only needs to be capable of generating the captured image group obtained by imaging the analysis specimen at a plurality of focal depths. The captured image is not also limited to a bright field image. The captured image only needs to be an image that can be optically captured, for example, a dark field image, a phase contrast image, a fluorescent image, or a polarization microscope image. The microscope imaging apparatus 110 may have a configuration capable of capturing those images.

[Configuration and Operation of Analysis Apparatus]

Figure 3:
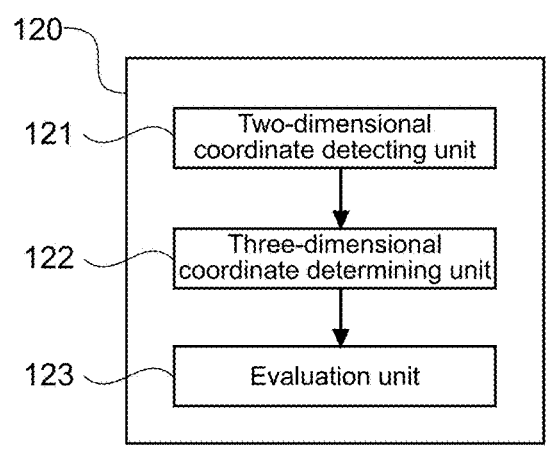
FIG. 3 is a block diagram showing a configuration of the analysis apparatus of the analysis system.
Figure 4:
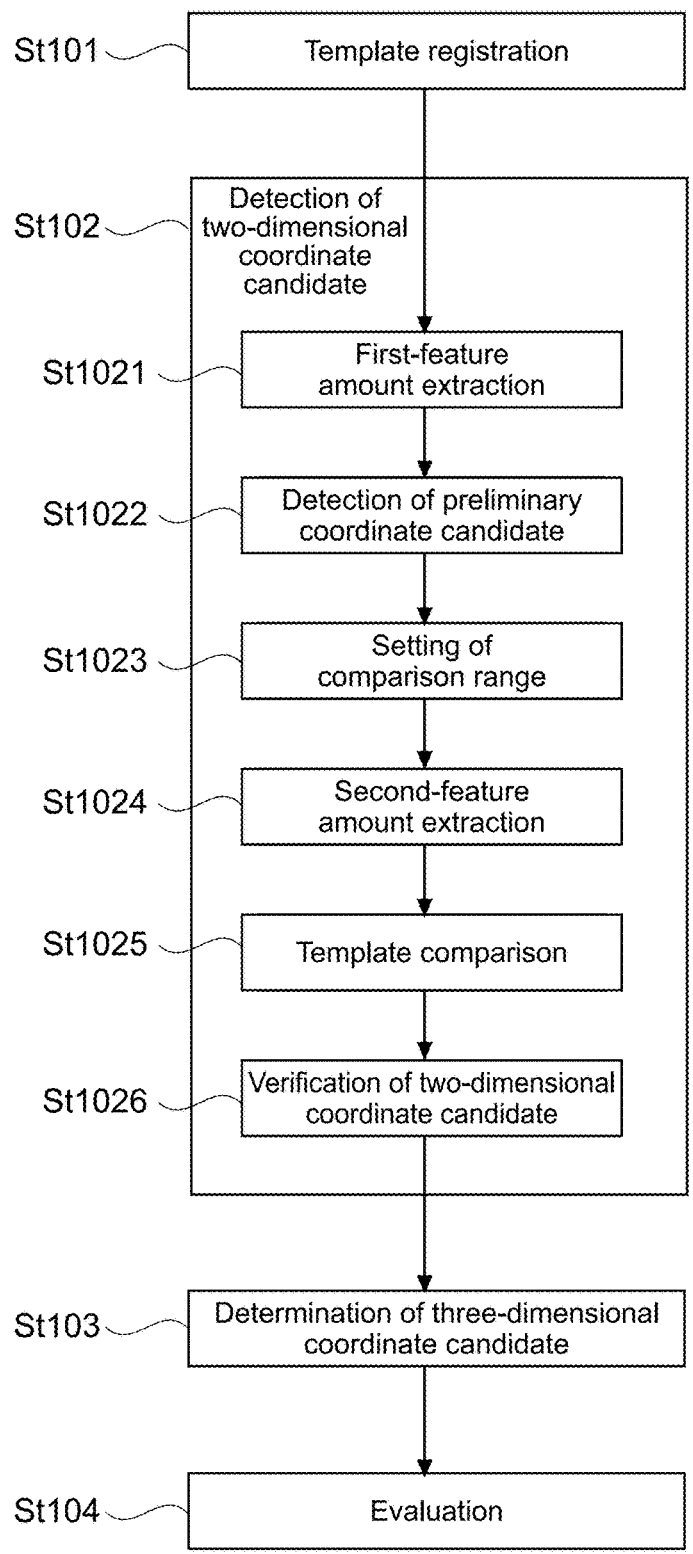
FIG. 4 is a flowchart showing an operation of the analysis apparatus of the analysis system.

The analysis apparatus 120 subjects the captured image group to image processing. Note that the captured image group processed by the analysis apparatus 120 is not limited to one supplied from the imaging mechanism 113, and may be a captured image group separately prepared. FIG. 3 is a block diagram showing a mechanical configuration of the analysis apparatus 120. FIG. 4 is a flowchart showing an operation of the analysis apparatus 120. As shown in FIG. 3, the analysis apparatus 120 includes a two-dimensional coordinate detecting unit 121, a three-dimensional coordinate determining unit 122, and an evaluation unit 123. Their configurations are functional configurations realized by the cooperation with hardware and software of a processor or the like. Each configuration will be described together with an operation of the analysis apparatus 120.

Figure 5:
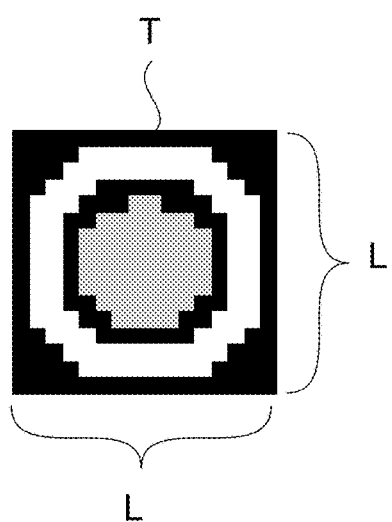
FIG. 5 is an example of a template used by the analysis apparatus of the analysis system.

In advance, a template is registered in the analysis apparatus 120 (St101). FIG. 5 is a schematic diagram of a template T. The template T indicates a feature amount of the analysis target object. In the template T, feature amounts of an image assumed as an image of the analysis target object are arranged depending on the shape and size of the analysis target object. The feature amount means an amount indicating the feature of the image. The feature amount may be a luminance of each pixel, a luminance difference between adjacent pixels, or a maximum value, a minimum value, an average value, or a variance value of the luminance or the luminance difference. The template shown in FIG. 4 indicates the feature amount in a gray scale.

The analysis apparatus 120 may be capable of selecting an appropriate template T depending on information on the analysis target object (e.g., spherical shape having a diameter of about 10μ) specified by a user. Alternatively, the user may directly specify the template T. As described above, the size of the template T is different depending on the analysis target object. In the following description, it is assumed that the template T is a square with sides each having a size of an L-pixel. Further, the analysis apparatus 120 may feed back information resulting from analysis of the analysis target object (to be described later) to the template.

The two-dimensional coordinate detecting unit 121 detects, from each of the captured images included in the captured image group, candidates of coordinates of the analysis target object (hereinafter, referred to as two-dimensional coordinate candidates) (St102). Specifically, the two-dimensional coordinate detecting unit 121 may detect the two-dimensional coordinate candidates in the following manner.

First, the two-dimensional coordinate detecting unit 121 extracts a first feature amount from a captured image G (St1021). Specifically, the two-dimensional coordinate detecting unit 121 converts each captured image into an eight-bit gray scale and extracts a luminance difference between pixels of a predetermined number of pixels (hereinafter, referred to as first number of pixels) as the first feature amount. The first number of pixels may be, for example, one pixel adjacent to each pixel. The two-dimensional coordinate detecting unit 121 extracts the luminance differences between the pixels of the first number of pixels smaller than a second number of pixels to be described later, and hence can perform the extraction of the luminance differences at high speed. Note that the two-dimensional coordinate detecting unit 121 may extract the maximum value, the minimum value, the average value, the variance value, or the like of the luminance or the luminance difference as the first feature amount.

Figure 6:
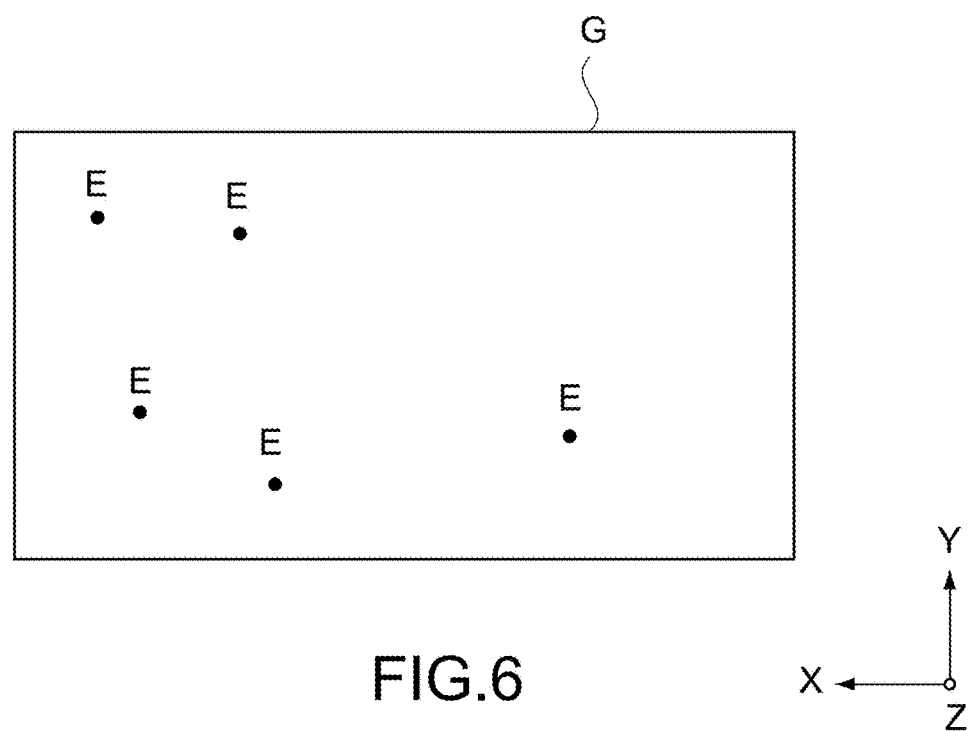
FIG. 6 is a schematic diagram of preliminary two-dimensional coordinate candidates detected by a two-dimensional coordinate detecting unit of the analysis apparatus of the analysis system.

Subsequently, the two-dimensional coordinate detecting unit 121 detects preliminary coordinate candidates by using the first feature amount (St1022). The two-dimensional coordinate detecting unit is capable of performing an edge detection by using the first feature amount and obtaining coordinates at which edges are detected as the preliminary coordinate candidates. Various algorithms can be used for the edge detection. If noise is removed by a threshold using the maximum value, the minimum value, the average value, the variance value, or the like of the luminance, the algorithms can be performed at high speed. FIG. 6 schematically shows preliminary coordinate candidates E detected in the captured image G.

Figure 7:
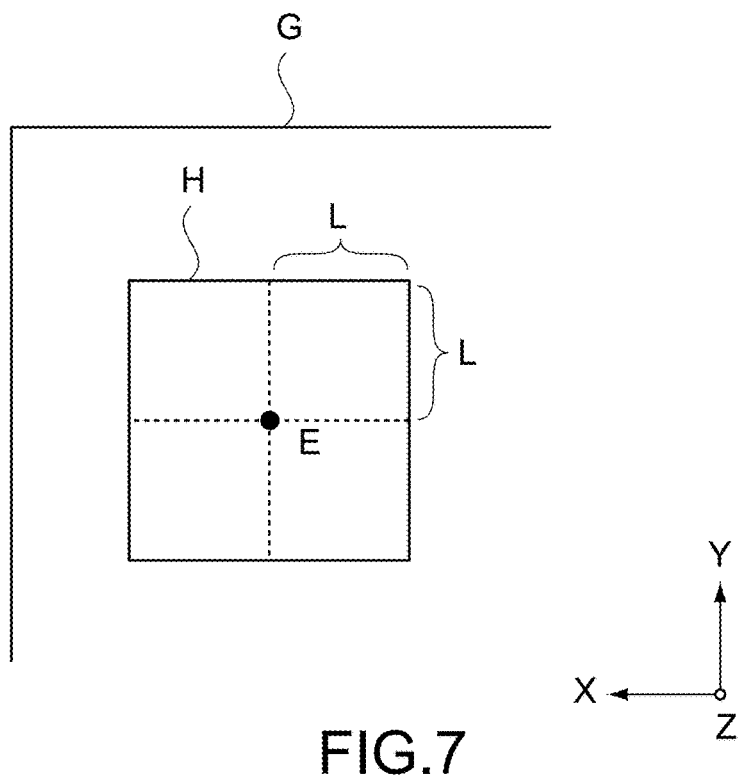
FIG. 7 is a schematic diagram of a comparison range set by the two-dimensional coordinate detecting unit of the analysis apparatus of the analysis system.

Subsequently, the two-dimensional coordinate detecting unit 121 sets a comparison range around each of the preliminary coordinate candidates E in the captured image G (St1023). The two-dimensional coordinate detecting unit 121 is capable of setting four blocks around the preliminary coordinate candidate E as the comparison range with the size of the template T being one block. Further, the two-dimensional coordinate detecting unit 121 may set a range different from this range as the comparison range. FIG. 7 shows a set comparison range H.

Subsequently, the two-dimensional coordinate detecting unit 121 extracts a second feature amount from the captured image G included in the comparison range H (St1024). Specifically, the two-dimensional coordinate detecting unit 121 converts each captured image G into an eight-bit gray scale and extracts each of the luminance differences between a predetermined number of pixels (hereinafter, referred to as second number of pixels) as the second feature amount. Note that the second number of pixels are larger than the first number of pixels. For example, the second number of pixels can be eight pixels around each pixel.

The two-dimensional coordinate detecting unit 121 extracts the luminance differences between the pixels of the second number of pixels larger than the first number of pixels, and hence can extract the second feature amount at high accuracy. However, the two-dimensional coordinate detecting unit 121 needs much time for extracting each pixel because the number of pixels to be extraction targets of the luminance differences with respect to each pixel is large. However, it is sufficient that the two-dimensional coordinate detecting unit 121 extracts not the entire captured image but only the comparison range H, and hence can perform the extraction at high speed. Note that the two-dimensional coordinate detecting unit 121 may extract the maximum value, the minimum value, the average value, the variance value, or the like of the luminance or the luminance difference as the second feature amount.

Figure 8:
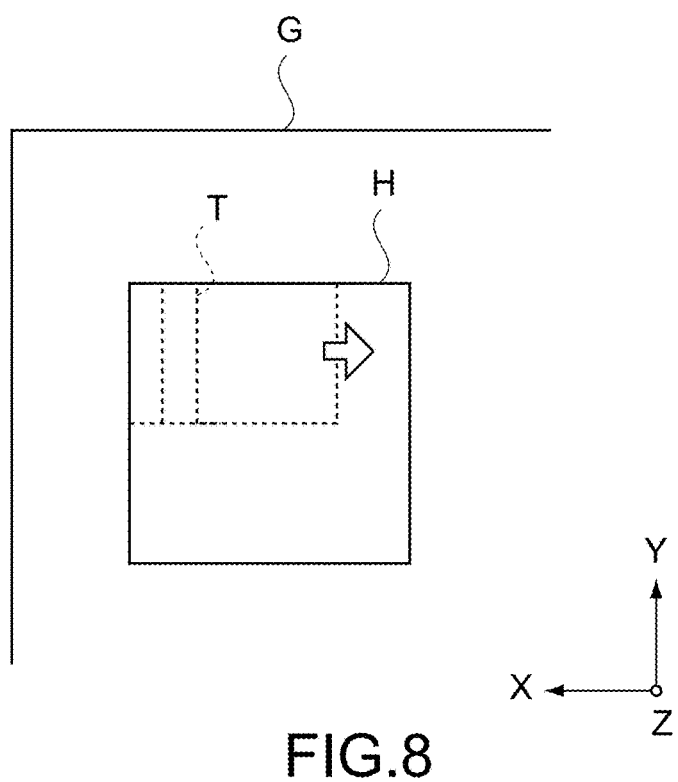
FIG. 8 is a schematic diagram showing a template comparison by the two-dimensional coordinate detecting unit of the analysis apparatus of the analysis system.

Subsequently, the two-dimensional coordinate detecting unit 121 performs a template comparison with respect to each comparison range H (St1025). FIG. 8 is a schematic diagram showing a state of the template comparison. As shown in the figure, the two-dimensional coordinate detecting unit 121 compares the feature amount of the template T with the second feature amount of the captured image G in a range overlapping with the template T while moving the template T in the comparison range H. The two-dimensional coordinate detecting unit 121 searches for the position of the template T having highest similarity between the feature amount of the template and the feature amount of the captured image G. Specifically, the two-dimensional coordinate detecting unit 121 is capable of calculating a difference of the feature amount between each pixel of the template T and each pixel of the captured image G overlapping with the template T, and calculating a comparison result P by adding such differences.

Figure 9:
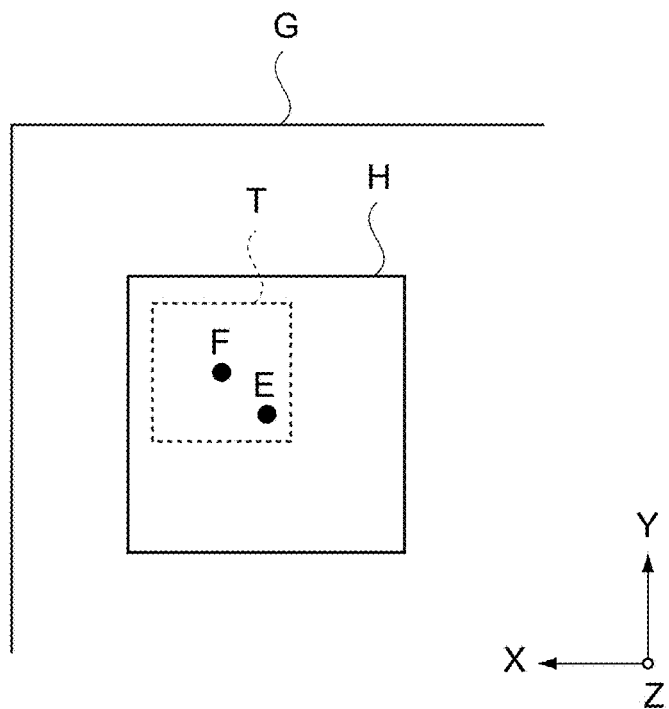
FIG. 9 is a schematic diagram of a two-dimensional coordinate candidate detected by the two-dimensional coordinate detecting unit of the analysis apparatus of the analysis system.

If the comparison result P is the smallest, the two-dimensional coordinate detecting unit 121 is capable of determining that the similarity between the feature amount of the template T and the second feature amount of the captured image G is the highest. The position of the template T in this case is used as a matching position. Then, the two-dimensional coordinate detecting unit 121 is capable of setting position coordinates of a center of the template T located at the matching position as the two-dimensional coordinate candidate. FIG. 9 shows two-dimensional coordinate candidates F detected by the two-dimensional coordinate detecting unit 121.

When a plurality of preliminary coordinate candidates E are detected, the two-dimensional coordinate detecting unit 121 sets, with respect to each of the preliminary coordinate candidates E, the comparison range H (St1023), extracts the second feature amount (St1024), and performs the template comparison (St1025).

Figure 10:
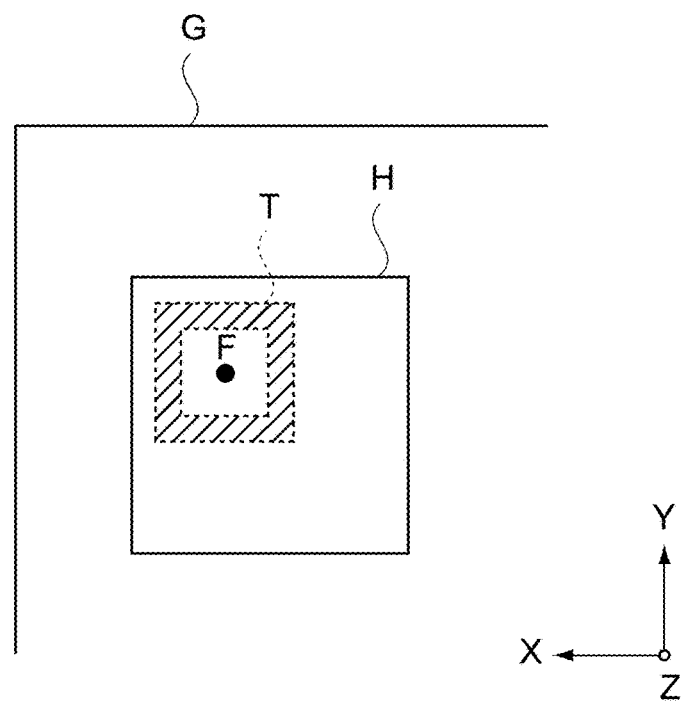
FIG. 10 is a schematic diagram showing a verification of the two-dimensional coordinate candidate by the two-dimensional coordinate detecting unit of the analysis apparatus of the analysis system.

Subsequently, the two-dimensional coordinate detecting unit 121 verifies the detected two-dimensional coordinate candidates F (St1026). FIG. 10 is a schematic diagram of this verification. The two-dimensional coordinate detecting unit 121 is capable of subtracting, with respect to the captured image G, a luminance value of a center portion (shaded part in figure) from a luminance value of a peripheral portion (inner part of shaded part in figure) of a pixel range overlapping with the template T located at the matching position, to thereby obtain a comparison result Q. The two-dimensional coordinate detecting unit 121 is capable of performing a verification of the two-dimensional coordinate candidate F by using the comparison result Q.

Specifically, in the case where the analysis target object has an almost-spherical shape, for example, a cell, the luminance of the center portion of that image is high (bright) and the luminance of the peripheral portion is low (dark). However, in the extraction step of the second feature amount, the second feature amount (luminance difference, etc.) is extracted and information on the luminance values is lost. Therefore, images in which the luminance of the center portion is low and the luminance of the peripheral portion is high are also detected together with images in which the luminance of the center portion is high and the luminance of the peripheral portion is low. Thus, the two-dimensional coordinate detecting unit 121 is capable of excluding the two-dimensional coordinate candidates F of the images with the inverted luminance from the candidates by using the comparison result Q.

The two-dimensional coordinate detecting unit 121 is capable of performing the above-mentioned steps (St1021 to St1026) on each of the captured images G included in the captured image group and detecting the two-dimensional coordinate candidates F in the respective captured image G. The two-dimensional coordinate detecting unit 121 supplies the detected two-dimensional coordinate candidates F to the three-dimensional coordinate determining unit 122. In addition, the two-dimensional coordinate detecting unit 121 supplies the comparison result P and comparison result Q calculated in the above-mentioned steps to the evaluation unit 123.

Figure 11:
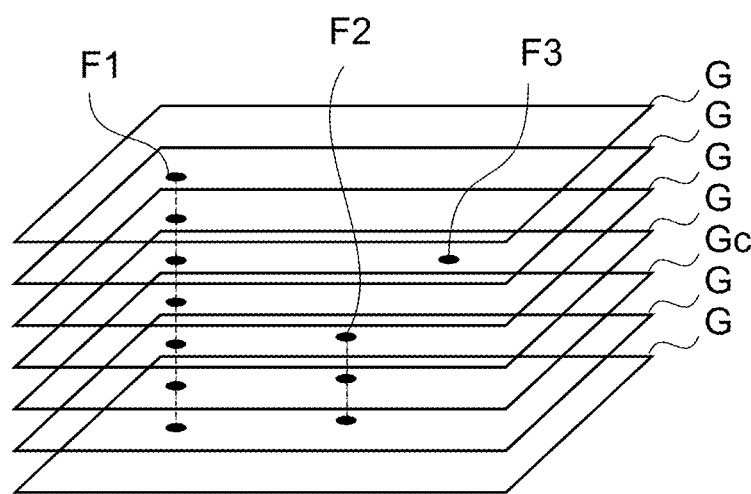
FIG. 11 is a schematic diagram showing a determination of a three-dimensional coordinate candidate by the three-dimensional coordinate determining unit of the analysis apparatus of the analysis system.
Figure 11:
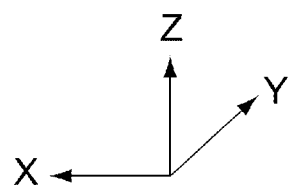

The three-dimensional coordinate determining unit 122 determines a three-dimensional coordinate candidate of the analysis target object based on the position relationship between the captured images G of the two-dimensional coordinate candidates F (St103). FIG. 11 is a schematic diagram showing the determination of the three-dimensional coordinate candidate by the three-dimensional coordinate determining unit 122. Specifically, the three-dimensional coordinate determining unit 122 counts a continuous number of the two-dimensional coordinate candidates F of the respective captured images G in the Z-direction. At this time, even if the two-dimensional coordinate candidates F do not completely correspond to each other between the captured images in the X- and Y-directions, as long as such displacement falls within an allowable range, the three-dimensional coordinate determining unit 122 is capable of determining that the two-dimensional coordinate candidates F are continuous.

If a continuous number of a group of the two-dimensional coordinate candidates (hereinafter, referred to as two-dimensional coordinate candidate group) in the Z-direction falls within a predetermined range, the three-dimensional coordinate determining unit 122 is capable of determining that this two-dimensional coordinate candidate group is the two-dimensional coordinate candidate group of the analysis target object. For example, FIG. 11 shows a case where the continuous number of a two-dimensional coordinate candidate group F1 in the Z-direction is too large and the continuous number of a two-dimensional coordinate candidate group F3 in the Z-direction is too small.

In this example, the three-dimensional coordinate determining unit 122 is capable of determining that a two-dimensional coordinate candidate group F2 is the two-dimensional coordinate candidate group of the analysis target object because the continuous number of the two-dimensional coordinate candidate group F2 falls within the predetermined range. The predetermined range of the continuous number is different depending on the size of the analysis target object in the Z-direction, the NA (numerical aperture) of the objective lens of the microscope optical system 111, a focal interval of the captured image group, and the like. The three-dimensional coordinate determining unit 122 is capable of obtaining an appropriate range of the continuous number by a specification by the user or from the template T.

If the continuous number falls within the predetermined range, the three-dimensional coordinate determining unit 122 is capable of determining a captured image G (Gc in FIG. 11) located at the center in the Z-direction out of the plurality of captured images G including that two-dimensional coordinate candidate group. The three-dimensional coordinate determining unit 122 is capable of determining the three-dimensional coordinate candidate with the focal depth at which this captured image Gc is captured being a Z-coordinate and the two-dimensional coordinate candidates in the captured image Gc of the two-dimensional coordinate candidate group F2 being X- and Y-coordinates.

The evaluation unit 123 evaluates similarity between an object image located at the three-dimensional coordinate and an analysis target object image by an evaluation function (St104). The evaluation function can be one using the above-mentioned comparison result P and comparison result Q, and specifically, expressed by the following [Equation 1].

$$f = a \times P + Q \qquad \text{[Equation 1]}$$

Note that "a" is an arbitrary coefficient.

As the comparison result P becomes smaller, the similarity between the object image and the template T becomes higher. The comparison result Q takes a negative value when the luminance value of the center portion of the object image is larger than the luminance value of the peripheral portion. Therefore, the evaluation unit 123 is capable of evaluating that the object image is similar to the analysis target object image when the value f is small. Note that the evaluation unit 123 may use only the comparison result P for the evaluation function or use an evaluation function different from [Equation 1] above.

For example, in a single-sort case where a single analysis target object (cell, etc.) is introduced into a single well, it is favorable that a single three-dimensional coordinate candidate of the analysis target object is determined from the captured image group obtained from the single well. However, even if a plurality of three-dimensional coordinate candidates are determined, the evaluation unit 123 performs an evaluation by using the evaluation function, and hence ranking of the similarity between the object image located at each of the three-dimensional coordinate candidates and the analysis target object image can be performed (see, Example).

Further, other than the single-sort case, for example, also in the case where the analysis specimen includes a plurality of analysis target objects or the analysis specimen includes objects in various forms and the analysis target object is determined from them, it is possible to determine the three-dimensional coordinate candidate of the analysis target object by applying a threshold to a result obtained using the evaluation function.

As described above, the analysis apparatus 120 is capable of determining the three-dimensional coordinate candidate of the analysis target object by image processing on the captured image group. With this, without searching for the analysis target object, the user can controls the field of view of the microscope optical system 111 to cover the analysis target object. Further, the analysis apparatus 120 may be capable of displaying analysis target object candidates located at the three-dimensional coordinate candidates on a display such that the user can select the analysis target object. In addition, as will be described later, the control apparatus 130 is capable of tracking the analysis target object and imaging or analyzing the analysis target object by using this three-dimensional coordinate candidate.

[Configuration and Operation of Control Apparatus]

The control apparatus 130 controls the microscope imaging apparatus 110. Specifically, the control apparatus 130 may control the microscope optical system 111, the XYZ stage 112, the imaging mechanism 113, and the like, to thereby control the field-of-view range of the microscope optical system 111 to cover the analysis specimen S and causes the imaging mechanism 113 to image an observation specimen via the microscope optical system 111.

Figure 12:
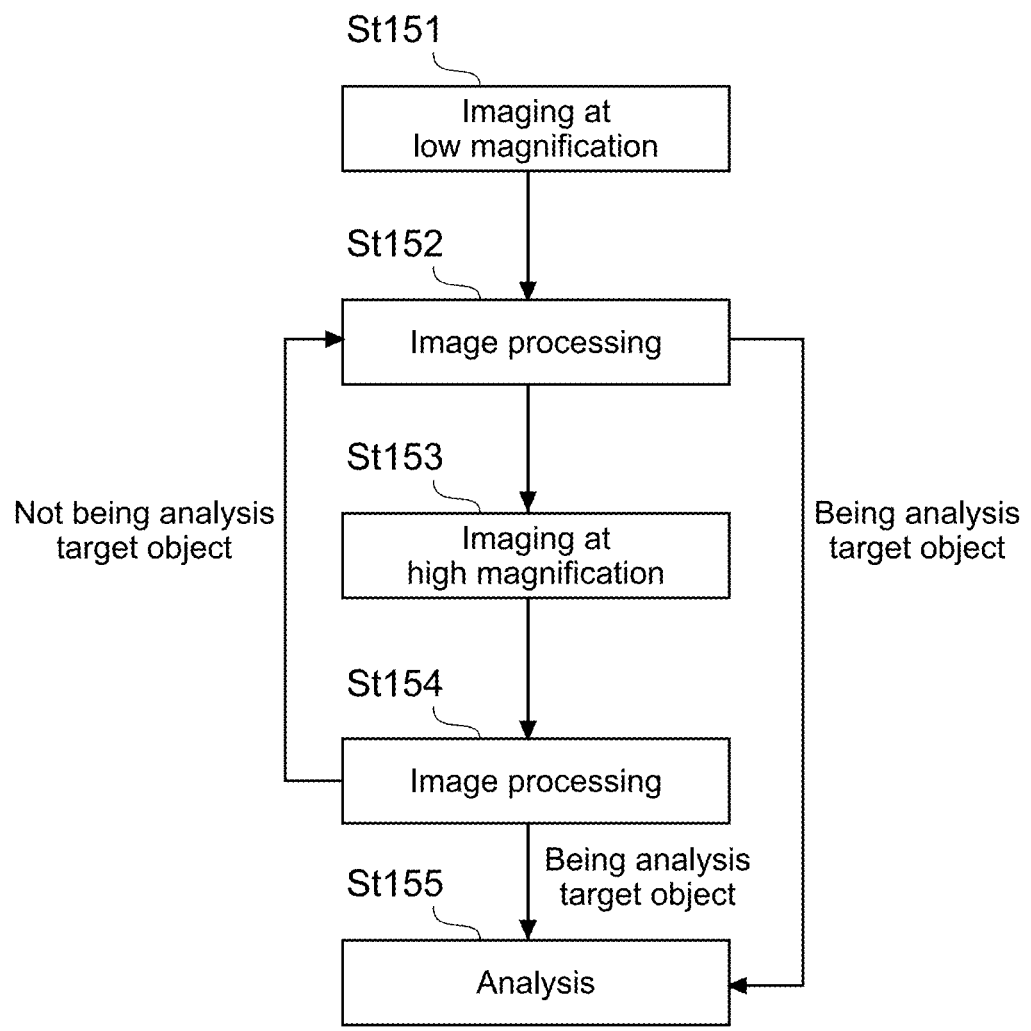
FIG. 12 is a flowchart showing an operation of the analysis system.

The control apparatus 130 is capable of using the three-dimensional coordinate candidate of the analysis target object that is determined the analysis apparatus 120 for controlling the microscope imaging apparatus 110. FIG. 12 is a flowchart showing an operation of the analysis system 100.

Figure 13A:
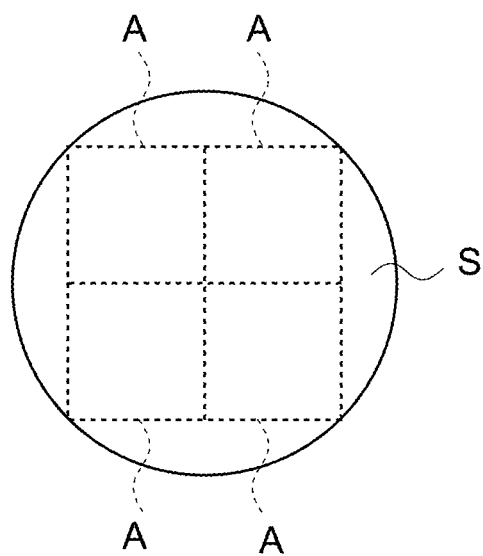
FIGS. 13A and 13B are schematic diagrams showing a microscope field-of-view range set by a control apparatus of the analysis system.
Figure 13B:
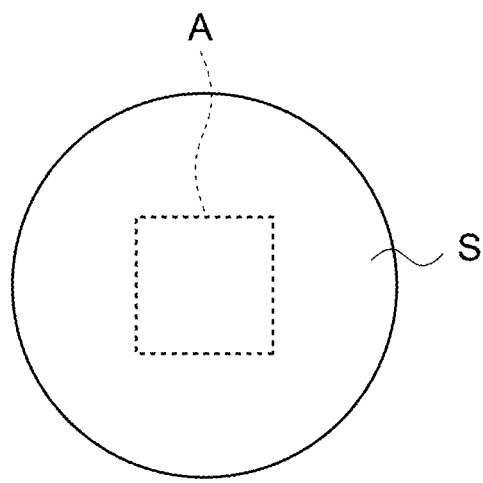

First, the control apparatus 130 causes the microscope imaging apparatus 110 to perform imaging at a low magnification (St151). Specifically, the control apparatus 130 controls the field-of-view range of the microscope optical system 111 at a low magnification to cover the analysis specimen. The control apparatus 130 controls the microscope optical system 111 and the imaging mechanism 113 to image an analysis specimen at a plurality of focal depths and generate a captured image group. FIG. 13 is a schematic diagram showing field-of-view ranges of the microscope optical system 111 at this time.

If a field-of-view range A of the microscope optical system 111 cannot cover the entire area of the analysis specimen S, the control apparatus 130 may set a plurality of field-of-view ranges A in the analysis specimen S as shown in Section (a) of FIG. 13, and cause the imaging mechanism 113 to image each of the field-of-view ranges A. Further, in the case where it is predicted that the analysis target object is present near the center of the analysis specimen S, for example, in the case where a highly-accurate single sorter is used, the control apparatus 130 may set a field-of-view range A only at the center of the analysis specimen S as shown in Section (b) of FIG. 13, and cause the imaging mechanism 113 to image the field-of-view range A.

The analysis apparatus 120 performs the above-mentioned image processing on the captured image group generated by imaging at a low magnification described above, and determines a three-dimensional coordinate candidate of the analysis target object (St152). If an object located at the three-dimensional coordinate candidate is the analysis target object, the control apparatus 130 may performs an analysis (St155) to be described later or may increase the magnification of the microscope optical system 111 and cause the imaging mechanism 113 to perform imaging at a high magnification (St153). When imaging at a high magnification is performed, if the three-dimensional coordinate candidate is determined in the image processing step (St152), the control apparatus 130 is capable of causing the imaging mechanism 113 to perform imaging at a high magnification by using this three-dimensional coordinate candidate. Note that, when carrying out imaging at a high magnification, the control apparatus 130 is also capable of causing the microscope optical system 111 to perform a focus detection and updating the three-dimensional coordinate candidate by using the detected focus.

The analysis apparatus 120 performs the above-mentioned image processing on a captured image group generated by imaging at a high magnification again, and determines a three-dimensional coordinate candidate of the analysis target object (St154). If an object located at the three-dimensional coordinate candidate is the analysis target object, the control apparatus 130 performs the analysis (St155). When the object located at the three-dimensional coordinate candidate is not the analysis target object, the control apparatus 130 causes the imaging mechanism 113 to perform the above-mentioned image processing step (St152).

When the object located at the three-dimensional coordinate candidate determined by either one of the image processing steps (St152 and St154) is the analysis target object, the control apparatus 130 performs an analysis (St155). Specifically, the control apparatus 130 is capable of causing the imaging mechanism 113 to image the analysis target object after controlling the field of view of the microscope optical system 111 to cover the determined three-dimensional coordinate candidate. For example, by performing determination processing of the three-dimensional coordinate candidate every time when a predetermined period of time elapses, the control apparatus 130 is capable of causing the imaging mechanism 113 to image the analysis target object every time when a predetermined period of time elapses. Thus, the control apparatus 130 is capable of causing the imaging mechanism 113 to perform time-lapse imaging.

Further, when a phase contrast imaging mechanism or a spectroscopy (infrared spectroscopy, Raman spectroscopy, etc.) mechanism is connected to the microscope optical system 111 of the microscope imaging apparatus 110, the control apparatus 130 is also capable of performing various analyses. In any case, the field-of-view range of the microscope optical system 111 is controlled to cover the three-dimensional coordinate candidate automatically determined. Therefore, without needing a search for the analysis target object, the user is capable of analyzing the analysis target object.

[Modified Example of Analysis System]

A modified example of the analysis system of the above-mentioned embodiment will be described.

Figure 14A:
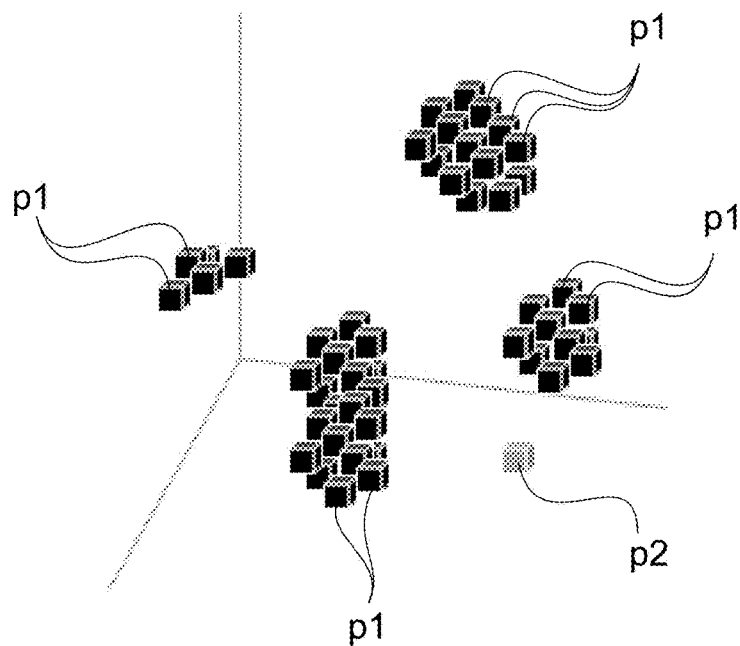
FIGS. 14A and 14B are schematic diagrams showing an operation of the analysis apparatus of the analysis system according to a modified example of the present disclosure.
Figure 14B:
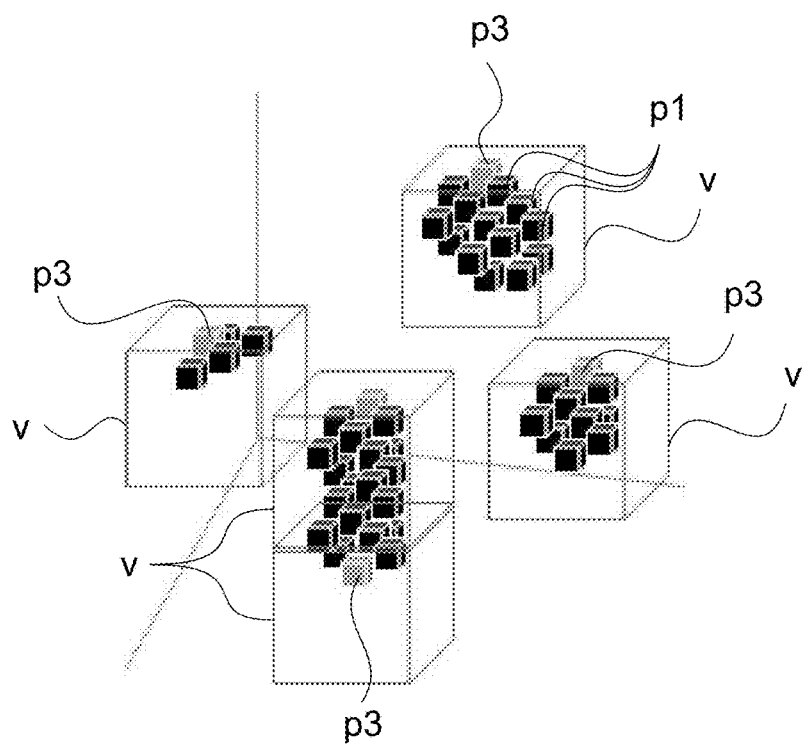

The analysis apparatus 120 may determine a coordinate three-dimensionally best matching by using not the two-dimensional template, but the three-dimensional template or size information of the analysis target object. FIG. 14 is a schematic diagram showing an operation of the analysis apparatus 120. As shown in Section (a) of FIG. 14, the analysis apparatus 120 acquires coordinates of pixels p1 having a luminance difference equal to or larger than a threshold value. At this time, the analysis apparatus 120 is capable of removing an isolated pixel p2 as noise.

As shown in Section (b) of FIG. 14, the analysis apparatus 120 is capable of searching for pixels p3 as keys and detecting a voxel v most similar to the analysis target object from among voxels v each having a predetermined range around each pixel p3. The voxel having the predetermined range can be, for example, 20 voxels.

Example

An example of the above-mentioned embodiment will be described. In this example, a hematopoietic stem cell (analysis target object) seeded in each well by a single sorter was used as the analysis specimen.

Figure 15A:
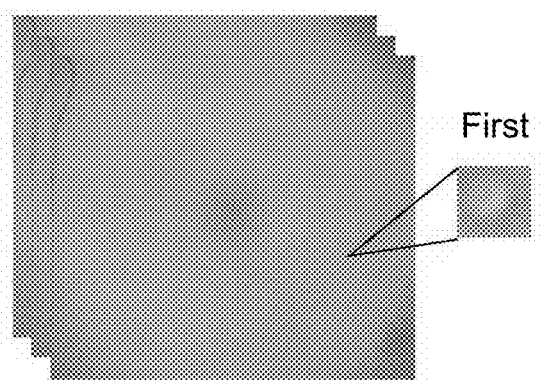
FIGS. 15A through 15C show captured images according to an example of the present disclosure.
Figure 15B:
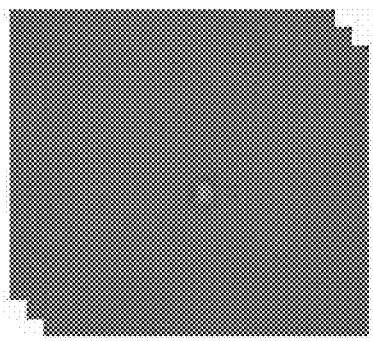
Figure 15C:
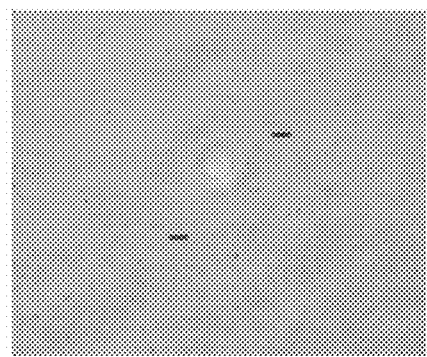

FIG. 15 shows images according this example. Section (a) of FIG. 15 shows a captured image group generated by Z-Stack imaging under the condition where the objective lens was at a magnification 4× and the amount of light was fixed. The imaged focal depth was of from 0 to 420 μm and the focal interval was 20 μm. The analysis apparatus determined a three-dimensional coordinate candidate of the analysis target object by the image processing according to the above-mentioned embodiment. Section (a) of FIG. 15 shows an object image located at a three-dimensional coordinate candidate (x, y, z) of a first-ranked evaluation result.

Section (b) of FIG. 15 shows a captured image group captured by bright-field Z-Stack imaging under the condition where the objective lens was at a magnification 60× and the amount of light was fixed with the three-dimensional coordinate candidate (x, y, z) of the first-ranked evaluation result being a center. The imaged focal depth was of from the Z-coordinate of the three-dimensional coordinate candidate to ±20 μm. A focus detection was performed on this captured images and the Z-coordinate was updated. The updated three-dimensional coordinate candidate is indicated by (x, y, z').

Section (c) of FIG. 15 shows a captured image captured by phase contrast imaging at the updated three-dimensional coordinate candidate (x, y, z') under the condition where the objective lens was at a magnification 60× and the amount of light was maximum. A spectroscopic frame is set in a center portion of the captured image. In this manner, the analysis apparatus determined the three-dimensional coordinate candidate of the analysis target object. Therefore, it was possible to perform an analysis (here, imaging at a high magnification) of the analysis target object by using the three-dimensional coordinate candidate.

Further, FIG. 16 shows an exemplary evaluation result by the evaluation unit. In the single cell sort case where a hematopoietic stem cell was seeded in each well, the result was obtained by ranking object images located at three-dimensional coordinate candidates determined from the captured image group obtained by imaging the respective wells, using the evaluation function. Regarding each well, an object image at the top in the evaluation function rank has a high possibility of being an image of the analysis target object (hematopoietic stem cell) seemed in that well. It was actually confirmed that the object image at the top of the evaluation rank was the hematopoietic stem cell by observation using a fluorescent image. Thus, it can be said that, with the analysis apparatus according to the above-mentioned embodiment, it is possible to determine the three-dimensional coordinate candidate of the analysis target object and to evaluate a possibility of the object image located at the three-dimensional coordinate candidate as the analysis target object.

It should be noted that the present disclosure may also take the following configurations.

(1) An analysis apparatus, including:
a two-dimensional coordinate detecting unit configured to detect, with respect to a captured image group obtained by capturing an analysis specimen including an analysis target object at a plurality of focal depths, a two-dimensional coordinate candidate being a candidate of a plane coordinate of the analysis target object in each captured image; and
a three-dimensional coordinate determining unit configured to determine, based on a position relationship of the plane coordinate candidates between the captured images, a three-dimensional coordinate candidate being a candidate of a three-dimensional coordinate of the analysis target object.

(2) The analysis apparatus according to (1), further including
an evaluation unit configured to evaluate similarity between an object image located at the three-dimensional coordinate candidate and an analysis target object image by an evaluation function.

(3) The analysis apparatus according to (1) or (2), in which
the three-dimensional coordinate determining unit is configured to determine the three-dimensional coordinate candidate based on a continuous number of the two-dimensional coordinate candidate in a focal depth direction.

(4) The analysis apparatus according to any one of (1) to (3), in which
the two-dimensional coordinate detecting unit is configured to detect the two-dimensional coordinate candidate by comparing a feature amount of the captured image with a template indicating a feature amount of the analysis target object.

(5) The analysis apparatus according to any one of (1) to (4), in which
the two-dimensional coordinate detecting unit is configured to extract a first feature amount from the captured image, detect a preliminary two-dimensional coordinate candidate based on the first feature amount, set a comparison range around the preliminary two-dimensional coordinate candidate, extract a second feature amount from the captured image included in the comparison range, and compare the second feature amount with the template, to thereby detect the two-dimensional coordinate candidate.

(6) The analysis apparatus according to any one of (1) to (5), in which
the first feature amount is a luminance difference between pixels of a first number of pixels, and
the second feature amount is a luminance difference between pixels of a second number of pixels larger than the first number of pixels.

(7) The analysis apparatus according to any one of (1) to (6), further including
an evaluation unit configured to evaluate similarity between an object image located at the three-dimensional coordinate candidate and an analysis target object image by using an evaluation function using a difference between the second feature amount of the captured image included in the comparison range and a feature amount of the template when the second feature amount most closely matches the template.

(8) The analysis apparatus according to any one of (1) to (7), in which
the two-dimensional coordinate detecting unit is configured to calculate a luminance difference between a center portion and a peripheral portion of the captured image included in the comparison range when the second feature amount most closely matches the template and to verify the two-dimensional coordinate candidate by using the luminance difference.

(9) The analysis apparatus according to any one of (1) to (8), in which
the evaluation unit is configured to evaluate, by an evaluation function using the luminance difference in addition to the difference between the second feature amount and the template, the similarity between the object image located at the three-dimensional coordinate candidate and the analysis target object image.

(10) An analysis program that causes an information processing apparatus to function as:
a two-dimensional coordinate detecting unit configured to detect, with respect to a captured image group obtained by capturing an analysis specimen including an analysis target object at a plurality of focal depths, a two-dimensional coordinate candidate being a candidate of a plane coordinate of the analysis target object in each captured image; and a three-dimensional coordinate determining unit configured to determine, based on a position relationship of the plane coordinate candidates between the captured images, a three-dimensional coordinate candidate being a candidate of a three-dimensional coordinate of the analysis target object.

(11) An analysis system, including:
a microscope imaging apparatus;
an analysis apparatus including
a two-dimensional coordinate detecting unit configured to detect, with respect to a captured image group obtained by the microscope imaging apparatus capturing an analysis specimen including an analysis target object at a plurality of focal depths, a two-dimensional coordinate candidate being a candidate of a plane coordinate of the analysis target object in each captured image, and
a three-dimensional coordinate determining unit configured to determine, based on a position relationship of the plane coordinate candidates between the captured images, a three-dimensional coordinate candidate being a candidate of a three-dimensional coordinate of the analysis target object; and
a control apparatus configured to control the microscope imaging apparatus by using the three-dimensional coordinate candidate.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An analysis apparatus, comprising:
a two-dimensional coordinate detecting unit configured to detect, with respect to a captured image group obtained by capturing an analysis specimen including an analysis target object at a plurality of focal depths, a two-dimensional coordinate candidate being a candidate of a plane coordinate of the analysis target object in each captured image; and
a three-dimensional coordinate determining unit configured to determine, based on a position relationship of the plane coordinate candidates between the captured images, a three-dimensional coordinate candidate being a candidate of a three-dimensional coordinate of the analysis target object,
wherein the two-dimensional coordinate detecting unit is configured to extract a first feature amount from the captured image, detect a preliminary two-dimensional coordinate candidate based on the first feature amount, set a comparison range around the preliminary two-dimensional coordinate candidate, extract a second feature amount from the captured image included in the comparison range, and compare a feature amount of a template with the second feature amount of the captured image in a range overlapping with the template when moving the template in the comparison range, to thereby detect the two-dimensional coordinate candidate.

2. The analysis apparatus according to claim 1, further comprising an evaluation unit configured to evaluate similarity between an object image located at the three-dimensional coordinate candidate and an analysis target object image by an evaluation function.

3. The analysis apparatus according to claim 1, wherein the three-dimensional coordinate determining unit is configured to determine the three-dimensional coordinate candidate based on a continuous number of the two-dimensional coordinate candidate in a focal depth direction.

4. The analysis apparatus according to claim 1, wherein the first feature amount is a luminance difference between pixels of a first number of pixels, and the second feature amount is a luminance difference between pixels of a second number of pixels larger than the first number of pixels.

5. The analysis apparatus according to claim 4, further comprising an evaluation unit configured to evaluate similarity between an object image located at the three-dimensional coordinate candidate and an analysis target object image by using an evaluation function using a difference between the second feature amount of the captured image included in the comparison range and the feature amount of the template when the second feature amount most closely matches the template.

6. The analysis apparatus according to claim 5, wherein the two-dimensional coordinate detecting unit is configured to calculate a luminance difference between a center portion and a peripheral portion of the captured image included in the comparison range when the second feature amount most closely matches the template and to verify the two-dimensional coordinate candidate by using the luminance difference.

7. The analysis apparatus according to claim 6, wherein the evaluation unit is configured to evaluate, by an evaluation function using the luminance difference in addition to the difference between the second feature amount and the template, the similarity between the object image located at the three-dimensional coordinate candidate and the analysis target object image.

8. A non-transitory computer-readable medium containing an analysis program that causes an information processing apparatus to function as:
a two-dimensional coordinate detecting unit configured to detect, with respect to a captured image group obtained by capturing an analysis specimen including an analysis target object at a plurality of focal depths, a two-dimensional coordinate candidate being a candidate of a plane coordinate of the analysis target object in each captured image; and
a three-dimensional coordinate determining unit configured to determine, based on a position relationship of the plane coordinate candidates between the captured images, a three-dimensional coordinate candidate being a candidate of a three-dimensional coordinate of the analysis target object,
wherein the two-dimensional coordinate detecting unit is configured to extract a first feature amount from the captured image, detect a preliminary two-dimensional coordinate candidate based on the first feature amount, set a comparison range around the preliminary two-dimensional coordinate candidate, extract a second feature amount from the captured image included in the comparison range, and compare a feature amount of a template with the second feature amount of the captured image in a range overlapping with the template when moving the template in the comparison range, to thereby detect the two-dimensional coordinate candidate.

9. An analysis system, comprising:
a microscope imaging apparatus;
an analysis apparatus including
a two-dimensional coordinate detecting unit configured to detect, with respect to a captured image group obtained by the microscope imaging apparatus capturing an analysis specimen including an analysis target object at a plurality of focal depths, a two-dimensional coordinate candidate being a candidate of a plane coordinate of the analysis target object in each captured image, and a three-dimensional coordinate determining unit configured to determine, based on a position relationship of the plane coordinate candidates between the captured images, a three-dimensional coordinate candidate being a candidate of a three-dimensional coordinate of the analysis target object, wherein the two-dimensional coordinate detecting unit is configured to extract a first feature amount from the captured image, detect a preliminary two-dimensional coordinate candidate based on the first feature amount, set a comparison range around the preliminary two-dimensional coordinate candidate, extract a second feature amount from the captured image included in the comparison range, and compare a feature amount of a template with the second feature amount of the captured image in a range overlapping with the template when moving the template in the comparison range, to thereby detect the two-dimensional coordinate candidate; and a control apparatus configured to control the microscope imaging apparatus by using the three-dimensional coordinate candidate.

10. The analysis apparatus according to claim 1, wherein the first and second feature amounts each are selected from the group consisting of a luminance of each pixel, a luminance difference between adjacent pixels, a maximum value of the luminance, a minimum value of the luminance, an average value of the luminance, a variance value of the luminance, a maximum value of the luminance difference, a minimum value of the luminance difference, an average value of the luminance difference, and a variance value of the luminance difference.

11. The analysis apparatus according to claim 3, wherein the three-dimensional coordinate determining unit is configured to determine a two-dimensional coordinate candidate group of the analysis target object when the continuous number of the two-dimensional coordinate candidate in the focal depth direction falls in a predetermined range.

* * * * *